UNITED STATES PATENT OFFICE.

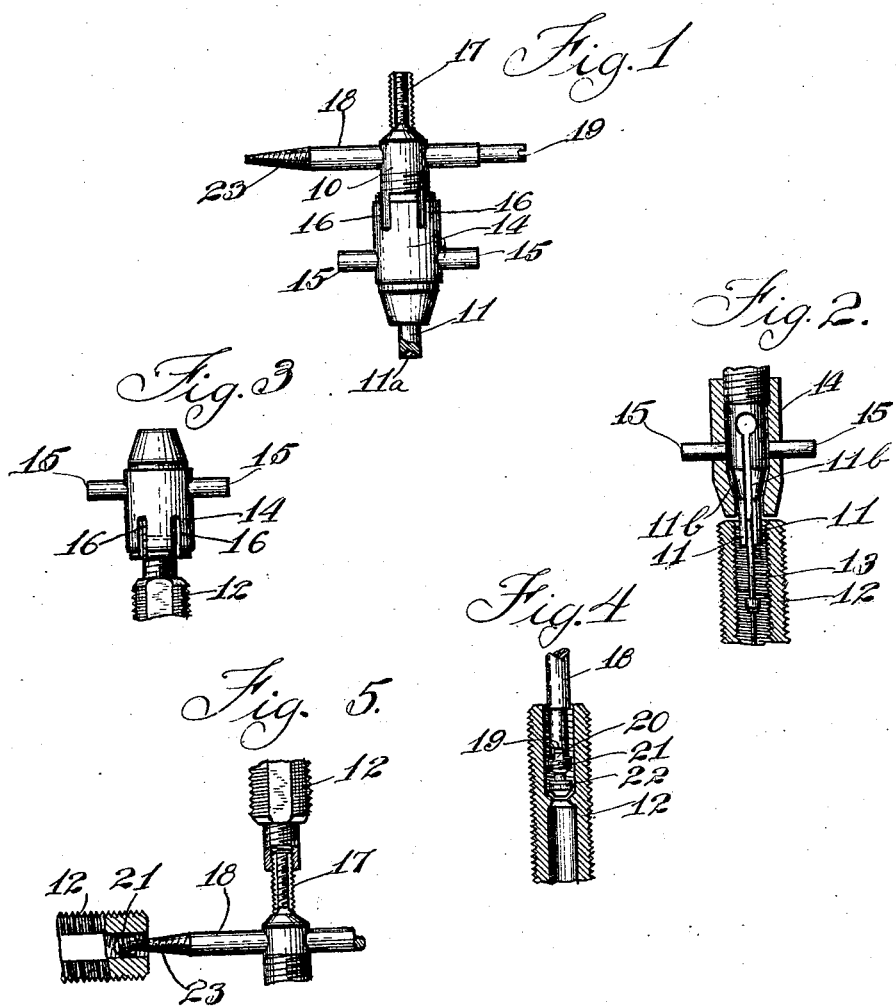

HARRY C. GIELOW, OF CHICAGO, ILLINOIS, ASSIGNOR TO ELGIN AUTO TOOL COMPANY, OF ELGIN, ILLINOIS, A CORPORATION OF ILLINOIS.

TIRE-VALVE TOOL.

1,415,628.      Specification of Letters Patent.      Patented May 9, 1922.

Application filed April 19, 1921. Serial No. 462,506.

*To all whom it may concern:*

Be it known that I, HARRY C. GIELOW, a citizen of the United States, residing at Chicago, in the county of Cook and State of Illinois, have invented a new and useful Improvement in Tire-Valve Tools, of which the following is a specification.

My invention relates to an improved form of tire valve tool in which I combine in a single tool a specially conformed clamp for removing the valve wire or rod from a valve stem of the kind ordinarily used in connection with pneumatic tires, with devices for removing the other parts of the valve from the valve stem and for also cleaning the threads of the valve stem.

I am aware that combination tools of the class herein referred to have been proposed in the past, but as far as I am aware I am the first to provide in a tool of this class the combination of a clamping means for the wire or rod of such a valve with devices for removing the remaining parts of the valve. It frequently occurs in removing the valves from the valve stems that while it is possible to remove the threaded collar holding the valve in the stem, the valve will stick and attempts to remove the valve wire or rod fail because of the inaccessibility of the rod or wire since it is usually wholly contained within the valve stem. Usually heretofore slender pliers have been employed to remove the wire or stem and these frequently fail on account of the small amount of room there is in which to work in the valve stem and frequently because of the breaking off of the outer end of the wire or rod in trying to remove it. In many cases it is necessary to take the tire off of the wheel and either to remove the valve stem from the inner tube or puncture the inner tube to remove the wire or rod. By my invention the clamping means is constructed to reach into the valve stem and firmly engage the rod or wire whatever its position in the stem may be, after which the clamping means readily pulls the rod or wire from the stem no matter how it may be caught or stuck in the stem, and of course in removing the rod the parts carried by it are also removed.

My invention will best be understood by reference to the accompanying drawings showing a preferred embodiment of my device, in which—

Figure 1 shows the complete device in side elevation;

Fig. 2 is a longitudinal sectional view of the clamping devices shown in Fig. 1 in the position assumed in removing a rod from a valve stem;

Fig. 3 shows in a view similar to Fig. 1 a part of the clamping means in the position assumed to clean the outside threads of the valve stem;

Fig. 4 shows in a view similar to Fig. 2 the relation of another part of the device in position in a valve stem for removing the threaded collar of a valve; and Fig. 5 shows other parts of the device in the relation they assume to the valve stem in cleaning the internal threads and removing the threaded collar of a valve when necessary.

Similar numerals refer to similar parts throughout the several views.

As shown in Fig. 1 my device consists of an externally threaded rod 10 which is drilled and split at its lower end as shown in said figure to form clamping jaws 11, said jaws being sufficiently long and of small enough diameter to readily enter a valve stem 12 as indicated in Fig. 2 to engage the upper end of a valve rod 13 whether the upper end of the rod is near the upper end of the valve stem or not. As indicated in Fig. 1 the lower ends of the jaws 11 are recessed at $11^a$ to impart a concave conical conformation in the lower ends of the jaws, which conformation centers the outer end of the valve rod if it happens to be to one side of the axis of the valve stem and thus directs the rod into the central hole in the jaws 11 when the jaws are inserted into the valve stem 12 so as to insure proper engagement between the jaws and valve rod without thought or attention on the part of the operator.

The clamping device is provided with a threaded sleeve 14 fitting the threads on the rod 10 and having a taper at its lower end for engaging the tapered portions $11^b$, $11^b$ of the jaws, as a result of which when the sleeve 14 is screwed onto the rod 10 by means of the projecting rods 15 the jaws 11 are forcibly moved toward each other to clamp the rod 13 between them. The upper end of the sleeve 14 as shown in Fig. 1 is preferably provided with slots 16 so that by removing the sleeve from the rod 10 the sleeve may be employed as indicated in Fig. 3 to clean the external threads on the outer end of the valve stem 12 provided to receive the valve cap, not shown, the threads in the sleeve 14 and on the rod 10 being purposely made of the same size and pitch as the external threads on the end of the valve stem 12.

My device is also provided with other members for effecting the removal of parts of valves of the class described and to facilitate renewing or replacing said valves without disturbing the tire on the wheel, or the valve stem in the tire, as follows: The rod 10 is extended above its threaded portion above described as shown in Fig. 1 and formed into a tap 17 having threads of the same size and pitch as the internal threads in the valve stem 12, and through the rod 10 between the clamping sleeve 14 and the tap 17 a cross-rod 18 extends to form a handle for the claming means and also for the tap 17, this rod 18 being preferably rigidly secured in the rod 10 and having formed on one end a cross slot 19 to engage a corresponding key 20 on the outer end of the threaded collar 21 of a valve of the kind described so that the threaded collar and attached valve member 22 may readily be removed from the valve stem 12. This end of the rod 18 is drilled as indicated to clear the valve rod during the removal of the collar 21. The other end of the rod 18 is tapered and provided with a left-hand thread as indicated at 23 which thread may be employed to enter and firmly engage the bore of the collar 21 in the event the key 20 is damaged so that removal by the other end of the rod 18 is impossible. When the thread 23 is in firm engagement with the collar 21 continued rotation of the rod 18 around in a left-hand direction serves to unscrew the collar 21 from the stem 12. In Fig. 5 I also illustrate the relation of the tap 17 in use to clean the internal threads of the valve stem 12, although it will be understood of course this figure is merely illustrative and that the device is never used to clean the said internal threads and remove a collar 21 at the same time.

To provide the device with proper wearing qualities I prefer to make the entire device of iron or steel and to case-harden or temper the parts depending upon the material of which they are made.

While I have shown my invention in the particular embodiment above described, it will be understood that I do not limit myself to this exact construction as I may employ equivalents known to the art at the time of the filing of this application without departing from the scope of the appended claims.

What I claim is:

1. In a device of the class described, the combination of a threaded rod having clamping jaws extending from one end thereof of a diameter to enter the bore of a valve stem, a sleeve engaging said threads to forcibly move said jaws toward each other, said threads being of the same size and pitch as the valve-cap threads of said valve stem and said sleeve having clearances extending from its threads permitting its use as a cleaning die for the valve-cap threads on said stem, a tap formed on the other end of said rod and having threads of the same diameter and pitch as the internal threads of said valve stem, the ends of said jaws being conically recessed to center the rod of said valve, and a cross rod extending from said threaded rod and secured thereto to form a handle for said threaded rod, said cross rod having a key-way formed across one of its ends and having a tapered left-hand thread formed on its other end.

2. In a device of the class described, the combination of a threaded rod having clamping jaws extending from one end thereof of a diameter to enter the bore of a valve stem, a sleeve engaging said threads to forcibly move said jaws toward each other, said threads being of the same size and pitch as the valve-cap threads of said valve stem and said sleeve having clearances extending from its threads permitting its use as a cleaning die for the valve-cap threads on said stem, the ends of said jaws being conically recessed to center the rod of said valve, and a cross rod extending from said threaded rod and secured thereto to form a handle for said threaded rod.

3. In a device of the class described, the combination of a threaded rod having clamping jaws extending from one end thereof of a diameter to enter the bore of a valve stem, a sleeve engaging said threads to forcibly move said jaws toward each other, said threads being of the same size and pitch as the valve-cap threads of said valve stem and said sleeve having clearances extending from its threads permitting its use as a cleaning die for the valve-cap threads on said stem, a tap formed on the other end of said rod and having threads of the same diameter and pitch as the internal threads of said valve stem, the ends of said jaws being conically recessed to center the rod of said valve, and a cross rod extending from said threaded rod and secured thereto to form a handle for said threaded rod.

4. In a device of the class described, the combination of a threaded rod having clamping jaws extending from one end thereof of a diameter to enter the bore of a valve stem, a sleeve engaging said threads to forcibly move said jaws toward each other, said threads being of the same size and pitch as the valve-cap threads of said valve stem and said sleeve having clearances extending from its threads permitting its use as a cleaning die for the valve-cap threads on said stem, a tap formed on the other end of said rod and having threads of the same diameter and pitch as the internal threads of said valve stem, the ends of said jaws being conically recessed to center the rod of said valve, and a cross rod extending from said threaded rod and secured thereto to form a handle for said threaded rod, said cross rod having a key-way formed across one of its ends.

5. In a device of the class described, the combination of a threaded rod having clamping jaws extending from one end thereof of a diameter to enter the bore of a valve stem, a sleeve engaging said threads to forcibly move said jaws toward each other, a tap formed on the other end of said rod and having threads of the same diameter and pitch as the internal threads of said valve stem, the ends of said jaws being conically recessed to center the rod of said valve, and a cross rod extending from said threaded rod and secured thereto to form a handle for said threaded rod, said cross rod having a key-way formed across one of its ends and having a tapered left-hand thread formed on its other end.

6. In a device of the class described, the combination of a threaded rod having clamping jaws extending from one end thereof of a diameter to enter the bore of a valve stem, a sleeve engaging said threads to forcibly move said jaws toward each other, said threads being of the same size and pitch as the valve-cap threads of said valve stem and said sleeve having clearances extending from its threads permitting its use as a cleaning die for the valve-cap threads on said stem, a tap formed on the other end of said rod and having threads of the same diameter and pitch as the internal threads of said valve stem, the ends of said jaws being conically recessed to center the rod of said valve, and a cross rod extending from said threaded rod and secured thereto to form a handle for said threaded rod, said cross rod having a tapered left-hand thread formed on its end.

7. In a device of the class described, the combination of a threaded rod having clamping jaws extending from one end thereof of a diameter to enter the bore of a valve stem, a sleeve engaging said threads to forcibly move said jaws toward each other, the ends of said jaws being conically recessed to center the rod of said valve, and a cross rod extending from said threaded rod and secured thereto to form a handle for said threaded rod.

8. In a device of the class described, the combination of a threaded rod having clamping jaws extending from one end thereof of a diameter to enter the bore of a valve stem, a sleeve engaging said threads to forcibly move said jaws toward each other, and a cross rod extending from said threaded rod and secured thereto to form a handle for said threaded rod.

9. In a device of the class described, the combination of a threaded rod having clamping jaws extending from one end thereof of a diameter to enter the bore of a valve stem, a sleeve engaging said threads to forcibly move said jaws toward each other, and a cross rod extending from said threaded rod and secured thereto to form a handle for said threaded rod, said cross rod having a tapered left-hand thread formed on its end.

10. In a device of the class described, the combination of a threaded rod having clamping jaws extending from one end thereof of a diameter to enter the bore of a valve stem, a sleeve engaging said threads to forcibly move said jaws toward each other, a tap formed on the other end of said rod and having threads of the same diameter and pitch as the interal threads of said valve stem, the ends of said jaws being conically recessed to center the rod of said valve, and a cross rod extending from said threaded rod and secured thereto to form a handle for said threaded rod, said cross rod having a tapered left-hand thread formed on its end.

In witness whereof, I hereunto subscribe my name this 6th day of April, A. D. 1921.

HARRY C. GIELOW.